United States Patent
Devdas et al.

(10) Patent No.: US 7,515,593 B2
(45) Date of Patent: Apr. 7, 2009

(54) METHOD AND SYSTEM FOR EFFICIENT FLOW CONTROL FOR CLIENT DATA FRAMES OVER GFP ACROSS A SONET/SDH TRANSPORT PATH

(75) Inventors: Vikram Devdas, Pleasanton, CA (US); Hitesh Amin, Petaluma, CA (US); John Diab, Santa Rosa, CA (US); Marc Bennett, Austin, TX (US); Ganesh Sundaram, Rohnert Park, CA (US); Thomas Eric Ryle, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/613,426

(22) Filed: Jul. 3, 2003

(65) Prior Publication Data

US 2005/0002338 A1 Jan. 6, 2005

(51) Int. Cl.
*H04L 12/56* (2006.01)
(52) U.S. Cl. .................. 370/395.51; 370/231; 709/235
(58) Field of Classification Search ......... 370/229–236, 370/410, 419, 429, 465–466, 395.51; 709/226, 709/235
See application file for complete search history.

(56) References Cited

U.S. PATENT DOCUMENTS

| 5,610,745 | A | | 3/1997 | Bennett | 359/139 |
|---|---|---|---|---|---|
| 5,638,518 | A | | 6/1997 | Malladi | 395/200.21 |
| 5,745,685 | A | * | 4/1998 | Kirchner et al. | 709/237 |
| 5,872,777 | A | * | 2/1999 | Brailean et al. | 370/349 |
| 5,941,972 | A | | 8/1999 | Hoese et al. | 710/129 |
| 5,959,994 | A | | 9/1999 | Boggs et al. | 370/399 |
| 6,393,489 | B1 | | 5/2002 | Sambamurthy et al. | 709/250 |
| 6,400,730 | B1 | | 6/2002 | Latif et al. | 370/466 |
| 6,636,529 | B1 | | 10/2003 | Goodman et al. | 370/469 |
| 2002/0004842 | A1 | * | 1/2002 | Ghose et al. | 709/235 |
| 2002/0083190 | A1 | | 6/2002 | Kamiya et al. | |

(Continued)

OTHER PUBLICATIONS

Mike Scholten and Zhenyu Zhu, "Data Transport Applications USing GFP", May 2002, IEEE Communications Magazin, pp. 96-103.*

(Continued)

*Primary Examiner*—Wing F Chan
*Assistant Examiner*—Saba Tsegaye
(74) *Attorney, Agent, or Firm*—Edell, Shapiro & Finnan, LLC

(57) ABSTRACT

A method and system for flow control of GFP-encapsulated client data frames over SONET/SDH transport networks is described. Transport interfaces, in the form of port cards, have FIFO buffers for receiving the GFP frames. In acknowledgment of the received frames, a transmitting transport interface receives an acknowledgement in form of a returned frame sequence number tag along with the available capacity in bytes of the buffer of the receiving transport interface. With a continuous update of buffer capacity and tracking the number of bytes in transit to the receiving transport interface, the transmitting transport interface maximizes the utilization of the channel through the SONET/SDH transport network, even with dropped frames or dropped acknowledgment tags.

20 Claims, 4 Drawing Sheets

U.S. PATENT DOCUMENTS

| | | | |
|---|---|---|---|
| 2002/0138611 A1* | 9/2002 | Roe et al. | 709/224 |
| 2002/0176450 A1 | 11/2002 | Kong et al. | 370/539 |
| 2002/0196784 A1 | 12/2002 | Masuda | |
| 2003/0074449 A1 | 4/2003 | Smith et al. | 709/226 |
| 2003/0091037 A1 | 5/2003 | Latif et al. | 370/355 |
| 2003/0112833 A1* | 6/2003 | Kamiya | 370/535 |
| 2003/0185223 A1* | 10/2003 | Tate et al. | 370/410 |
| 2003/0218981 A1 | 11/2003 | Scholten | 370/235 |
| 2004/0076175 A1 | 4/2004 | Patenaude | 370/465 |
| 2004/0085902 A1 | 5/2004 | Miller et al. | 370/235 |
| 2004/0085904 A1 | 5/2004 | Bordogna et al. | 370/236 |

OTHER PUBLICATIONS

Paul Bonenfant et al., "Generic Framing Procedure (GFP): The Catalyst for Efficient Data over Transport", IEEE Communications Magazine, vol. 40, No. 5, May 1, 2002, pp. 72-79.

Enrique Hernandez-Valenda et al., "The Generic Framing Procedure (GFP): An Overview", IEEE Communications Magazine, vol. 40, No. 5, May 1, 2002, pp. 63-71.

Steven S. Gorshe et al., "Transparent Generic Framing (rocedure (GFP): A Protocol for Efficient Transport of Block-Coded Data through SONET/SDH Networks", IEEE Communications Magazine, vol. 40, No. 5, May 1, 2002, pp. 88-95.

* cited by examiner

METHOD AND SYSTEM FOR EFFICIENT FLOW CONTROL FOR CLIENT DATA FRAMES OVER GFP ACROSS A SONET/SDH TRANSPORT PATH

BACKGROUND OF THE INVENTION

The present invention relates generally to digital communication networks, and more specifically, to methods and systems for efficiently transporting Fibre Channel client data, among other protocols, over a SONET/SDH network path.

SONET/SDH and optical fiber have emerged as significant technologies for building large scale, high speed, Internet Protocol (IP) based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the network interconnection of computer devices is Fibre Channel, the core standard of which is described in ANSI (American National Standards Institute) X3.230-1994. Arising out of data storage requirements, Fibre Channel currently provides for bi-directional gigabit-per-second transport over communication networks in Fibre Channel frames that consist of standardized sets of bits used to carry data over the network system. Fibre Channel links are limited to no more than 10 kilometers.

New standards and protocols have emerged to combine the advantages of the SONET/SDH and Fibre Channel technologies. For example, it is sometimes desirable to link two SANs (Storage Area Networks), which operate with Fibre Channel protocol, over a MAN (Metropolitan Area Network), or even a WAN (Wide Area Network), which typically operates under SONET or SDH standards. This extension of Fibre Channel from 100 kilometers to over several hundred, or even thousand, kilometers, is made by mapping Fibre Channel ports to a SONET/SDH path for transport across a SONET/SDH network. One way to perform this function is to encapsulate Fibre Channel client data frames into transparent Generic Framing Protocol (GFP-T) frames and then map the GFP-T frames into SONET/SDH frames for transport across the SONET/SDH network.

Fibre Channel systems have two types of flow control: 1) end-to-end, and 2) buffer-to-buffer credit. In both types of flow control, two ports report to each other how many frames is available at that port's buffer to receive Fibre Channel frames from the other port. In end-to-end flow control, the source and destination ports are the two ports and the ports signal each other the reception of a transmitted frame by an ACK Link Control frame. In buffer-to-buffer credit, the two ports on opposite sides of a link are the two ports and the ports communicate the reception of a transmitted frame with an R_Rdy Primitive signal. But flow control is within the Fibre Channel network and is based on counting Fibre Channel frames which can vary.

In the present invention, flow control is provided across SONET/SDH transport networks which connected frame-based protocol networks, such as Fibre Channel and gigabit Ethernet. Furthermore, flow control is based on bytes to better utilize the size of the buffer receiving GFP-encapsulation frames.

SUMMARY OF THE INVENTION

The present invention provides for a method and system for efficiently transmitting GFP-encapsulated client data frames from a local transport interface and at least one local port associated with the local transport interface across a SONET/SDH transport network to a remote transport interface and at least one remote port associated with the remote transport interface which has a buffer for holding the GFP-encapsulated client data frames received across the SONET/SDH transport network.

In one aspect of the invention, the method generally has the steps of receiving information from the remote transport interface of the memory space available in the buffer by bytes; tracking the number of bytes of GFP-encapsulated client data frames in transit from the local transport interface to the remote transport interface; and transmitting more GFP-encapsulated client data frames responsive to the information of the number of bytes available in the remote transport interface buffer and the number of bytes in transit from the local transport interface to the remote transport interface to maximize usage of, without overfilling, the buffer. This allows the SONET/SDH transport network from the local transport interface to the remote transport interface to be efficiently utilized.

In another aspect of the invention, the local transport interface comprises at least one integrated circuit adapted to receive information from the remote transport interface of memory available in the buffer in terms of bytes to hold GFP-encapsulated client data frames; to track the number of bytes of GFP-encapsulated client data frames in transit from the local transport interface to the remote transport interface; and to transmit more GFP-encapsulated client data frames responsive to the information of the number of bytes available in the remote transport interface buffer and the number of bytes in transit from the local transport interface to the remote transport interface to maximize usage of, without overfilling, the buffer for efficient utilization of the SONET/SDH transport network from the local network interface to the remote network interface.

The client data frames can include Fibre Channel frames, gigabit Ethernet and other frame-based protocols.

The above is a brief description of some deficiencies in the prior art and features of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
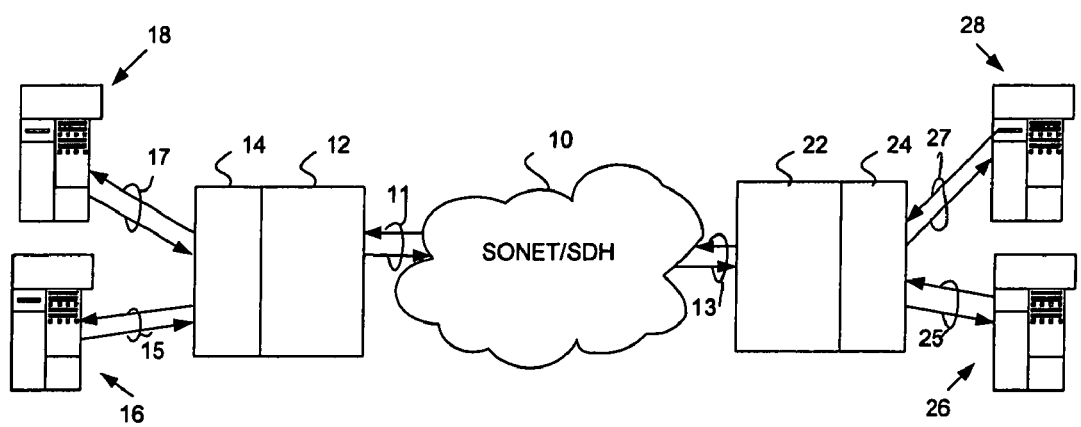
FIG. 1 is a diagram illustrating an exemplary network employing the present invention.

FIG. 1 illustrates a context for the present invention, an exemplary network Fiber Channel ports are connected over a SONET/SDH transport network 10. In the present example, it is assumed that the ports operate under Fibre Channel protocol, though the ports may also operate under other frame-based protocols, such as gigabit Ethernet, in accordance with the present invention.

In the exemplary network Fibre Channel ports 16 and 18 are connected by Fibre Channel links 15 and 17 respectively to a multi-port Fibre Channel card 14. Likewise, a second Fibre Channel port card 24 is connected by Fibre Channel links 25 and 27 to Fibre Channel ports 26 and 27 respectively. The Fibre Channel ports 16, 18, 26 and 28 are associated with elements which are interconnected by Fibre Channel. These elements include data storage elements, including disk drive arrays, RAIDs, disk farms, or possibly Fibre Channel network elements, such as routers, switches, or other Fibre Channel network elements. In FIG. 1 each Fibre Channel port card 14 and 24 is connected to a pair of Fibre Channel ports for purposes of illustration, and more ports may be connected to each Fibre Channel port card.

The SONET/SDH network 10 provides a transport path to connect the Fibre Channel ports 16 and 18 with the Fibre Channel ports 26 and 28. Optical transport platforms 12 and 22, such as ONS 15454 (available from Cisco Systems, Inc. of San Jose, Calif.), provide the interface between the Fibre Channel and SONET/SDH networks. The Fibre Channel ports 16 and 18 are connected to the multi-port Fibre Channel card 14 which is adapted to fit into the optical transport platform 12; and the Fibre Channel ports 26 and 28 are connected to the multi-port Fibre Channel card 24 which adapted to fit into the optical transport platform 22. Through the Fibre Channel port cards 14 and 24, which function as transport interfaces with the platforms 12 and 22 respectively, the Fibre Channel ports 16 and 18 are interconnected to the Fibre Channel ports 26 and 28 across the SONET/SDH network transport path. The result is that there are two virtual wires for the connection between a representative Fibre Channel port at one end of the SONET/SDH network 10, say, port 18, and a representative Fibre Channel port at the other end, say, port 28. As explained above, GFP-T, transparent Generic Framing Procedure, is conventionally used as the framing protocol for such a network for encapsulating the Fibre Channel payloads at one end of the SONET/SDH network 10 to be transmitted across the SONET/SDH network and for decapsulating the Fibre Channel data at the other end. By GFP-T protocol, the GFP-T frames have fixed lengths and, in this embodiment, the frame length is set at $(67 \times 19)+4=1277$ bytes long.

While the port cards 14 and 24, and their respective optical platforms 12 and 22 are the transport interfaces for the exemplary network of FIG. 1, for the described embodiment of the present invention, the transport interfaces can be considered to located in the port cards 12 and 22 only. The cards 12 and 22 each have FIFO (First-In First-Out) buffers to hold the GFP frames received from the SONET/SDH transport network 10 before the encapsulated Fibre Channel frames are stripped out of the GFP-encapsulation frames and passed on to their Fibre Channel port destinations. The present invention provides for the efficient transport of the GFP-encapsulated Fibre Channel frames between the Fibre Channel port cards 14 and 24 (and their respectively connected ports) across the SONET/SDH network 10.

Figure 2A:
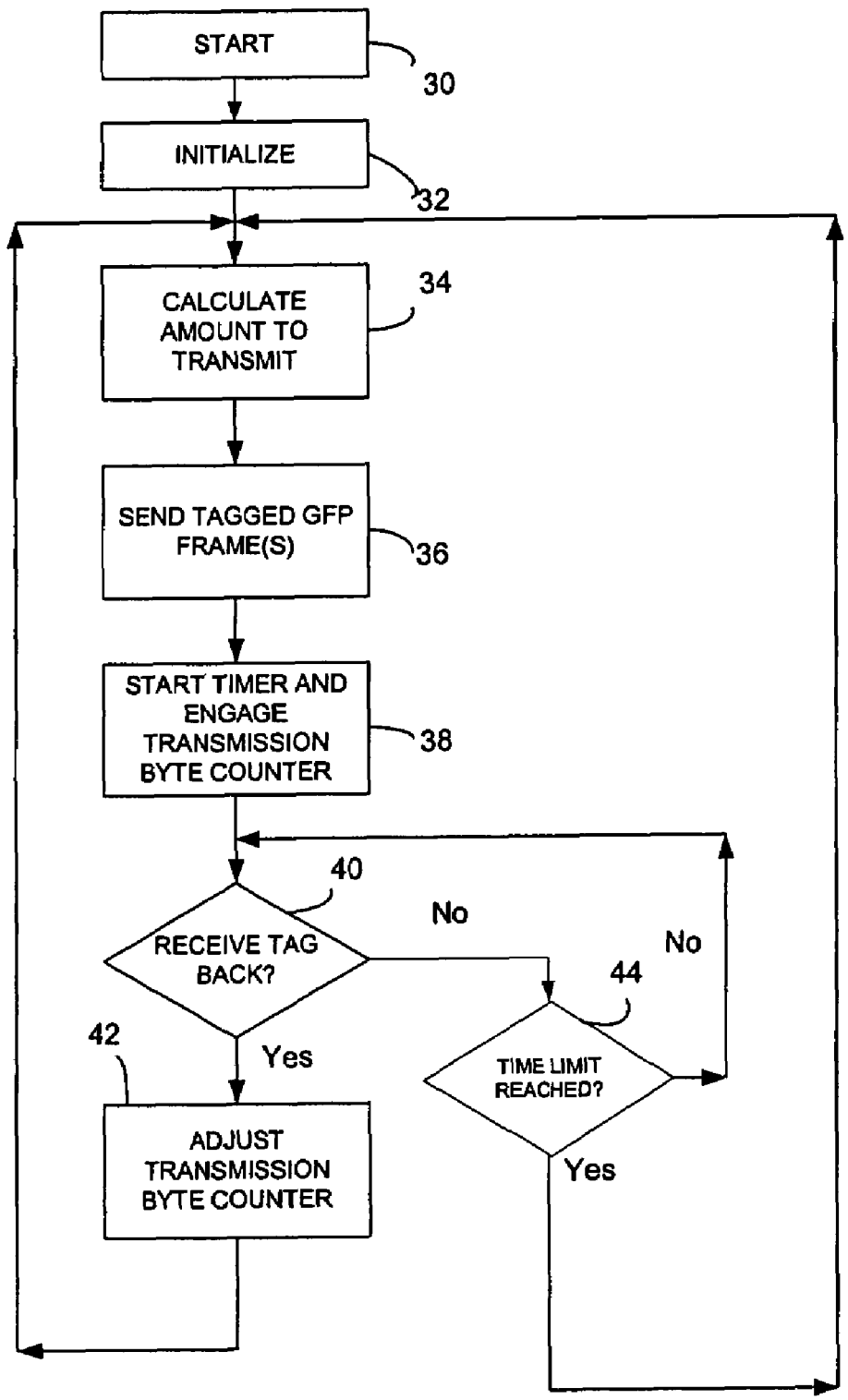
FIG. 2A is a flow chart of operations of a transport interface, a port card, in the exemplary network of FIG. 1, according to one embodiment of the present invention.
Figure 2B:
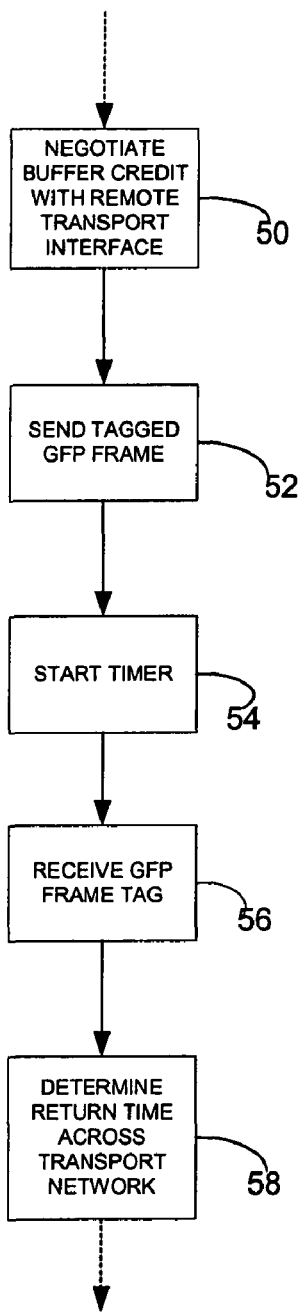
FIG. 2B is a flow chart of operations in the initialization step in the FIG. 2A operations.

FIG. 2A is a flow chart which illustrates the steps of operation of a local transport interface, say, the port card 14, which is transmitting GFP frames to the port card 24, the remote transport interface. After the start 30, an initialization step 32 sets certain values for the transmitting process; FIG. 2B illustrates the details of the initialization step 32. In substep 50 the amount of memory set aside in the buffer of the receiving port card 24 for the GFP frames from the transmitting port card 14 is negotiated by the two port cards, similar to the negotiation called for in Fibre Channel protocol. In step 52 an initial GFP frame with a sequence numbered tag is transmitted by the port card 14 to the port card 24 and at the time, the port card 14 also starts a timer in step 54. Across the SONET/SDH transport network 10, the port card 24 upon receipt of the tagged GFP frame, stores the frame in its FIFO buffer and in acknowledgment sends the sequence numbered tag (and the amount of bytes of remaining available memory in its buffer) back across the SONET/SDH transport network 10 to the port card 14. Upon receiving the tag in step 56, the port card 14 has an indication of the time required for a GFP frame to traverse the SONET/SDH network 10 and for the return of the frame's tag. The port card 14 accordingly determines a time limit T for a tag to be returned after the transmittal of its GFP frame by step 58. For example, T might be 12 ms for a 1200 kilometer round trip delay. If a tag is not returned by T, it can be assumed that either the GFP frame or its returning tag is lost in transit across the SONET/SDH network 10.

Returning to the flow chart of FIG. 2A and after the initialization step 32, the local port card 14 determines the number of GFP frames which should be transmitted to the port card 24 in step 34. This determination is made by subtracting the total number of bytes in transit from the local port card 14 which is counted by a transmission byte counter (step 38 below) from the number of bytes available in the FIFO buffer of the remote port card 24 which accompanies the returned tag. Initially, the number of bytes in transit is zero so that the calculated amount of bytes to transmit is maximum. By step 36, the GFP encapsulation frames are sent by the local transport interface and the local port card 14 attaches a unique tag to each frame to identify the particular frame. By step 38 the local transport interface also starts the timer and engages the transmission byte counter to count the number of bytes being transmitted to the remote port card 24.

On the other side of the SONET/SDH transport network 10, the remote port card 24 stores each received GFP frame into its buffer and transmits the frame tag with the current amount of available buffer memory available back across the SONET/SDH transport network 10 to the local port card 14.

The local port card 14 in step 40 waits for the return of the transmitted GFP frame tags from the remote port card 24. If a tag has been received, the process moves to step 42 by which the transmission byte counter is adjusted to keep a current count of the number of bytes in transit to the remote card 24. Since each GFP frame has the same fixed length, i.e., the same number of bytes, the counter is decremented by the same amount for each tag received. Then the process returns to step 34 and the process starts over again. With the information about the amount of available space in the FIFO buffer and the updated bytes in transit, a new calculation is made to transmit the maximum number of bytes to fill the channel in the SONET/SDH transport network 10.

On the other hand, if the test in step 40 indicates that a return tag has not been received from the remote port card 24, then step 44 tests whether the time limit T has been reached. If not, the process returns to step 40. If the time limit has been reached, the GFP-frame is assumed to have been lost. In fact, the frame could have been lost in the transit across the SONET/SDH transport network 10 or the fame's tag could been lost in the return back across the transport network. In either case, the process returns to step 34 with the remote buffer capacity information from the last received sequence numbered tag and the next untransmitted GFP frame is sent.

It should be noted that the described transmission process is directed toward the efficient transmission of GFP-encapsulated client data frames across a SONET/SDH transport network, i.e., the transmission of the maximum amount of client data across the transport network in the shortest time possible. The retransmission and replacement of lost frames is handled by higher level network protocols.

The described transmission process operates continuously. The local port card 14 continuously updates its view of the FIFO buffer availability of the remote port 24. If the transmitted GFP frames are dropped or if the reception acknowledgment tag is lost on the return transmission, the effectiveness of the transmission channel between the two port cards 14 and 23 is reduced only temporarily. As soon as new information is received, the local port card 14 self-corrects itself continuously and quickly determines the correct amount of buffer available in the remote port card 24. The transmitting port card 14 always uses the channel across the transport network 10 most efficiently and makes up for any lost bandwidth due to dropped GFP frames or tag acknowledgments. It should be evident that transmission in the opposite direction across the SONET/SDH transport network 10 also benefits from the present invention.

Figure 3:
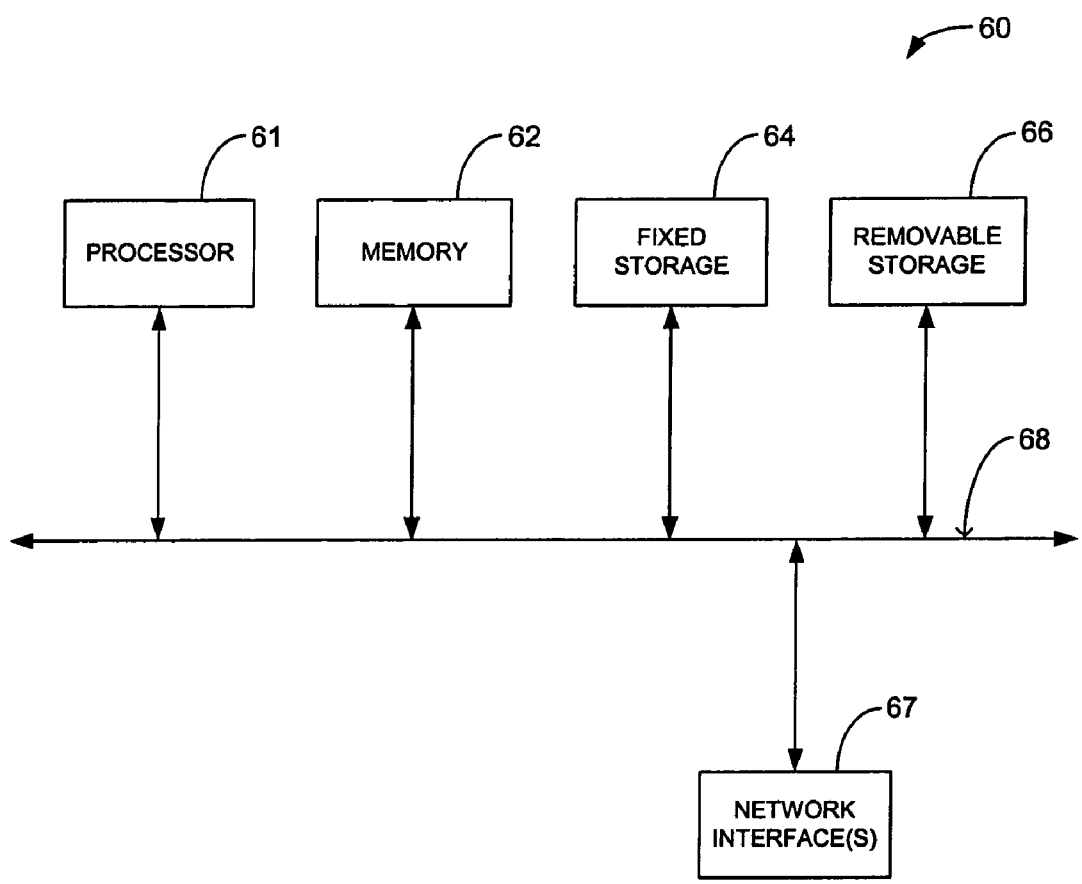
FIG. 3 is a block diagram of a portion of a port card of FIG. 1, according to one embodiment of the present invention.

The embodiment of the present invention described above is best implemented in the port cards 14 and 24 in the exemplary network of FIG. 1. The operations described above require a timer and counter, besides logic. A hardware implementation in an ASIC (Application Specific Integrated Circuit) or an FPGA (Field Programmable Gate Array) is preferred for a high-speed implementation of the present invention for optimal transmission of the client data frames across the SONET/SDH transport network.

Where throughput is not necessarily paramount, the present invention might be implemented in firmware, such as the ROM (Read-Only Memory) of a microcontroller, or in software which offers certain advantages. For instance, the processor unit instructed by the software might also perform operations other than those described, or upgrades can be made easily in software. FIG. 3 shows a block diagram of a representative computer system 60 that may be used to execute the software of an embodiment of the invention. The computer system 60 includes memory 62 which can store and retrieve software programs incorporating computer code that implements aspects of the invention, data for use with the invention, and the like. Exemplary computer readable storage media include CD-ROM, floppy disk, tape, flash memory, semiconductor system memory, and hard drive. The computer system 60 further includes subsystems such as a central processor 61, fixed storage 64 (e.g., hard drive), removable storage 66 (e.g., CD-ROM drive), and one or more network interfaces 67, all connected by a system bus 68. Other computer systems suitable for use with the invention may include additional or fewer subsystems. For example, computer system 60 may include more than one processor 61 (i.e., a multi-processor system) or a cache memory. The computer system 60 may also include a display, keyboard, and mouse (not shown) for use as a host.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for efficiently transmitting GFP-encapsulated client data frames from a local transport interface and at least one local port associated therewith across a SONET/SDH transport network to a remote transport interface and at least one remote port associated therewith, said remote transport interface having a buffer for holding said GFP- encapsulated client data frames received across said SONET/SDH transport network, the method comprising:

sending an identification tag for said local transport interface with at least an initial one of said GFP-encapsulated client data frames;

receiving information from said remote transport interface of memory available in said buffer in terms of bytes to hold GFP-encapsulated client data frames and of round trip transit time indication, the information including a confirmation that the remote transport interface has received the at least one of said GFP-encapsulated client data frames having the identification tag;

receiving identification tags for each of said GFP-encapsulated client data frames received by said remote transport interface and the number of bytes available in said remote transport interface buffer at the time of receipt of said identification tag by said remote transport interface;

determining whether an identification tag has been received from said remote transport interface within a predetermined amount of time;

tracking the number of bytes of GFP-encapsulated client data frames, sent after the at least one of said GFP-encapsulated client data frames having the identification tag, in transit from said local transport interface to said remote transport interface, including counting the number of bytes of each of said GFP-encapsulated client data frames transmitted by said local transport interface to said remote transport interface; and transmitting GFP-encapsulated client data frames responsive to said information of said number of bytes available in said remote transport interface buffer and said number of bytes in transit from said local transport interface to said remote transport interface to maximize usage of, without overfilling, said buffer, including transmitting more GFP-encapsulated client data frames responsive to said determining that said identification tag has not been received within said predetermined amount of time so that said SONET/SDH transport network from said local transport interface to said remote transport interface is efficiently utilized compensates for lost bandwidth due to dropped GFP frames or tag acknowledgments.

2. The method of claim 1 wherein said client data comprise Fibre Channel signals.

3. The method of claim 1 wherein said client data comprise gigabit Ethernet signals.

4. The method of claim 1 wherein said receiving step further comprises:
   initially negotiating with said remote transport interface for the total amount of space in said buffer reserved for GFP-encapsulated client data frames received from said local transport interface.

5. The method of claim 1 wherein said tracking step further comprises:
   calculating the number of bytes of GFP-encapsulated client data frames in transit from said local transport interface to said remote transport interface from said received identification tag and said number of bytes available in said remote transport interface buffer.

6. In a network system for transporting GFP-encapsulated client data frames across a SONET/SDH transport network to a remote transport interface having a buffer, a local transport interface connected to at least one local port, said local transport interface comprising:
   at least one integrated circuit adapted to send an identification tag with at least an initial one of said GFP-encapsulated client data frames and to receive information from said remote transport interface of memory available in said buffer in terms of bytes to hold GFP-encapsulated client data frames; to receive identification tags for each of said GFP-encapsulated client data frames received by said remote transport interface and the number of bytes available in said remote transport interface buffer; to determine whether an identification tag has been received from said remote transport interface within a predetermined amount of time; to count the number of bytes of each of said GFP-encapsulated client data frames transmitted by said local transport interface to said remote transport interface; to track the number of bytes of GFP-encapsulated client data frames in transit from said local transport interface to said remote transport interface; to transmit GFP-encapsulated client data frames responsive to said information of said number of bytes available in said remote transport interface buffer and said number of bytes in transit from said local transport interface to said remote transport interface to maximize usage of, without overfilling, said buffer; and to transmit more GFP-encapsulated client data frames responsive to said determining that said identification tag has not been received within said predetermined amount of time so that said SONET/SDH transport network from said local network interface to said remote network interface compensates for lost bandwidth due to dropped GFP frames or tag acknowledgments.

7. The transport interface of claim 6 wherein said client data comprise Fibre Channel signals.

8. The transport interface of claim 6 wherein said client data comprise gigabit Ethernet signals.

9. The transport interface of claim 6 wherein said at least one integrated circuit is further adapted to initially negotiate with said remote transport interface for the total amount of space in said buffer reserved for GFP-encapsulated client data frames received from said local transport interface.

10. The transport interface of claim 6 wherein said at least one integrated circuit is further adapted to calculate the number of bytes of GFP-encapsulated client data frames in transit from said local transport interface to said remote transport interface from said received identification tag and said number of bytes available in said remote transport interface buffer.

11. The transport interface of claim 6 wherein said at least one integrated circuit is selected from a group comprising ASICs and FPGAs.

12. The transport interface of claim 6 wherein said at least one integrated circuit comprises a processor and at least one memory subunit, said wherein said processor is configured by software code stored in the memory subsystem.

13. In a network system for transporting GFP-encapsulated client data frames across a SONLT/SDH transport network to a remote transport interface having a buffer, a local transport interface connected to at least one local port, said local transport interface comprising:
   means for sending an identification tag with at least an initial one of said GFP-encapsulated client data frames and receiving, in response thereto, information from said remote transport interface of memory available in said buffer in terms of bytes to hold GFP-encapsulated client data frames and of transit time indication in response to at least one acknowledgment tag;
   means for counting the number of bytes of each of said GFP-encapsulated client data frames transmitted by said local transport interface to said remote transport interface;
   means for tracking the number of bytes of GFP-encapsulated client data frames in transit from said local transport interface to said remote transport interface;
   means for receiving identification tags for each of said GFP-encapsulated client data frames received by said remote transport interface and the number of bytes available in said remote transport interface buffer;
   means for determining whether an identification tag has been received from said remote transport interface within a predetermined amount of time;
   means for transmitting GFP-encapsulated client data frames responsive to said information and said number of bytes in transit from said local transport interface to said remote transport interface to maximize usage of, without overfilling, said buffer; and
   means for transmitting more GFP-encapsulated client data frames responsive to a determination that an identification tag has not been received within said predetermined amount of time so that said SONET/SDH transport network from said local network interface to said remote network interface compensates for lost bandwidth due to dropped GFP frames or tag acknowledgments.

14. The transport interface of claim 13 wherein said client data comprise Fibre Channel signals.

15. The transport interface of claim 13 wherein said client data comprise gigabit Ethernet signals.

16. The transport interface of claim 13 further comprising:
   means for initially negotiating with said remote transport interface for the total amount of space in said buffer reserved for GFP-encapsulated client data frames received from said local transport interface.

17. The transport interface of claim 13 further comprising:
   means for calculating the number of bytes of GFP-encapsulated client data frames in transit from said local transport interface to said remote transport interface from said received identification tag and said number of bytes available in said remote transport interface buffer.

18. A method for efficiently transmitting GFP-encapsulated client data frames from a local transport interface and at least one local port associated therewith across a SONET/SDH transport network to a remote transport interface and at least one remote port associated therewith, said remote transport interface having a buffer for holding said GFP-encapsulated client data frames received across said SONET/SDH transport network, the method comprising:
   receiving information, in response to at least an initial tagged encapsulated client data frame, from said remote transport interface of memory available in said buffer in terms of a number of bytes to hold GFP-encapsulated client data frames;

tracking the number of bytes of GFP-encapsulated client data frames in transit from said local transport interface to said remote transport interface, including timing at said local port against a time limit to check for loss of GFP-encapsulated client data frames across the transport network; and transmitting GFP-encapsulated client data frames responsive to said information of said number of bytes available in said remote transport interface buffer and said number of bytes in transit from said local transport interface to said remote transport interface and to said timing receipt of tag acknowledgments to maximize usage of, without overfilling, said buffer, including transmitting more GFP-encapsulated client data frames responsive to a determination that an identification tag has not been received within said time limit, so that said SONLT/SDH transport network from said local transport interface to said remote transport interface compensates for lost bandwidth due to dropped GFP frames or tag acknowledgments.

19. In a network system for transporting GFP-encapsulated client data frames across a SONLT/SDH transport network to a remote transport interface having a buffer, a local transport interface connected to at least one local port, said local transport interface comprising:

at least one integrated circuit adapted to receive information from said remote transport interface of memory available in said buffer in terms of a number of bytes to hold GFP- encapsulated client data frames in response to at least an initial tagged encapsulated client data frame; to track the number of bytes of GFP-encapsulated client data frames in transit from said local transport interface to said remote transport interface, including timing receipt of a tag acknowledgment against a time limit to check for loss of GFP-encapsulated client data frames across the transport network; and to transmit GFP-encapsulated client data frames responsive to said information of said number of bytes available in said remote transport interface buffer and said number of bytes in transit from said local transport interface to said remote transport interface and to said timing to maximize usage of, without overfilling, said buffer, including to transmit more GFP-encapsulated client data frames responsive to a determination that an identification tag has not been received within said time limit, so that said SONET/SDH transport network from said local network interface to said remote network interface compensates for lost bandwidth due to dropped GFP frames and tag acknowledgments.

20. The network system for transporting GFP-encapsulated client data frames across a SONET/SDH transport network of claim 19 further comprising a network protocol for handling retransmission of lost frames.

* * * * *